(12) United States Patent
Ishida

(10) Patent No.: US 7,356,355 B2
(45) Date of Patent: Apr. 8, 2008

(54) WIRELESS BASE STATION FOR REDUCING INTERFERENCE FROM A CONTROL SIGNAL EMITTED BY ANOTHER WIRELESS BASE STATION

(75) Inventor: Akira Ishida, Hirakata (JP)

(73) Assignee: Sanyo Electric Co, Ltd., Osaka (JP)

( * ) Notice: Subject to any disclaimer, the term of this patent is extended or adjusted under 35 U.S.C. 154(b) by 0 days.

(21) Appl. No.: 11/504,046

(22) Filed: Aug. 15, 2006

(65) Prior Publication Data

US 2007/0026805 A1    Feb. 1, 2007

Related U.S. Application Data

(62) Division of application No. 09/715,087, filed on Nov. 20, 2000, now Pat. No. 7,110,793.

(30) Foreign Application Priority Data

Nov. 19, 1999    (JP)    ................... 11-330706

(51) Int. Cl.
*H04B 1/02*    (2006.01)
(52) U.S. Cl. ............... 455/562.1; 455/458; 455/522; 455/67.1; 455/69; 455/461
(58) Field of Classification Search ............... 455/561, 455/562.1, 522, 458, 69, 67.1
See application file for complete search history.

(56) References Cited

U.S. PATENT DOCUMENTS

| | | | |
|---|---|---|---|
| 4,425,567 A | 1/1984 | Tresselt | |
| 5,267,262 A | 11/1993 | Wheatley, III | |
| 5,644,622 A * | 7/1997 | Russell et al. ............ | 455/422.1 |
| 5,657,374 A * | 8/1997 | Russell et al. ............... | 370/328 |
| 5,708,441 A * | 1/1998 | Kanai ......................... | 342/359 |
| 6,070,084 A | 5/2000 | Hamabe | |
| 6,091,970 A | 7/2000 | Dean | |
| 6,118,983 A | 9/2000 | Egusa et al. | |
| 6,141,335 A * | 10/2000 | Kuwahara et al. .......... | 370/342 |
| 6,144,861 A | 11/2000 | Sundelin et al. | |
| 6,233,466 B1 | 5/2001 | Wong et al. | |
| 6,282,422 B1 | 8/2001 | Aikawa et al. | |
| 6,324,397 B1 | 11/2001 | Adachi et al. | |
| 6,370,128 B1 | 4/2002 | Raitola | |
| 6,397,082 B1 * | 5/2002 | Searle ...................... | 455/562.1 |
| 6,411,612 B1 * | 6/2002 | Halford et al. ............. | 370/347 |
| 6,415,163 B1 * | 7/2002 | Keskitalo et al. ......... | 455/562.1 |
| 6,438,389 B1 * | 8/2002 | Sandhu et al. ............ | 455/562.1 |
| 6,453,177 B1 * | 9/2002 | Wong et al. ............. | 455/562.1 |
| 6,498,804 B1 | 12/2002 | Ide et al. | |

(Continued)

FOREIGN PATENT DOCUMENTS

JP    7-245579    9/1995

(Continued)

*Primary Examiner*—Duc M. Nguyen
*Assistant Examiner*—Khawar Iqbal
(74) *Attorney, Agent, or Firm*—Arent Fox LLP

(57) ABSTRACT

A signal processing unit 50 in a wireless base station forms an omni-directional pattern to intermittently transmit a control signal, forms an antenna array pattern to receive a control signal from a mobile station, and further transmits a link channel allocation using either an omni-directional pattern or an antenna array pattern.

3 Claims, 10 Drawing Sheets

U.S. PATENT DOCUMENTS

| | | |
|---|---|---|
| 6,504,830 B1 | 1/2003 | Ostberg et al. |
| 6,522,898 B1 * | 2/2003 | Kohno et al. ............ 455/562.1 |
| 6,539,227 B1 | 3/2003 | Jetzek et al. |
| 6,556,845 B1 * | 4/2003 | Ide et al. ................. 455/562.1 |
| 6,594,250 B1 | 7/2003 | Silventoinen et al. |
| 6,731,949 B2 * | 5/2004 | Hamabe et al. ............ 455/522 |
| 6,782,277 B1 * | 8/2004 | Chen et al. .............. 455/562.1 |

FOREIGN PATENT DOCUMENTS

| | | |
|---|---|---|
| JP | 9-284200 | 10/1997 |
| JP | 11-74831 | 3/1999 |
| JP | 11-289287 | 10/1999 |

* cited by examiner

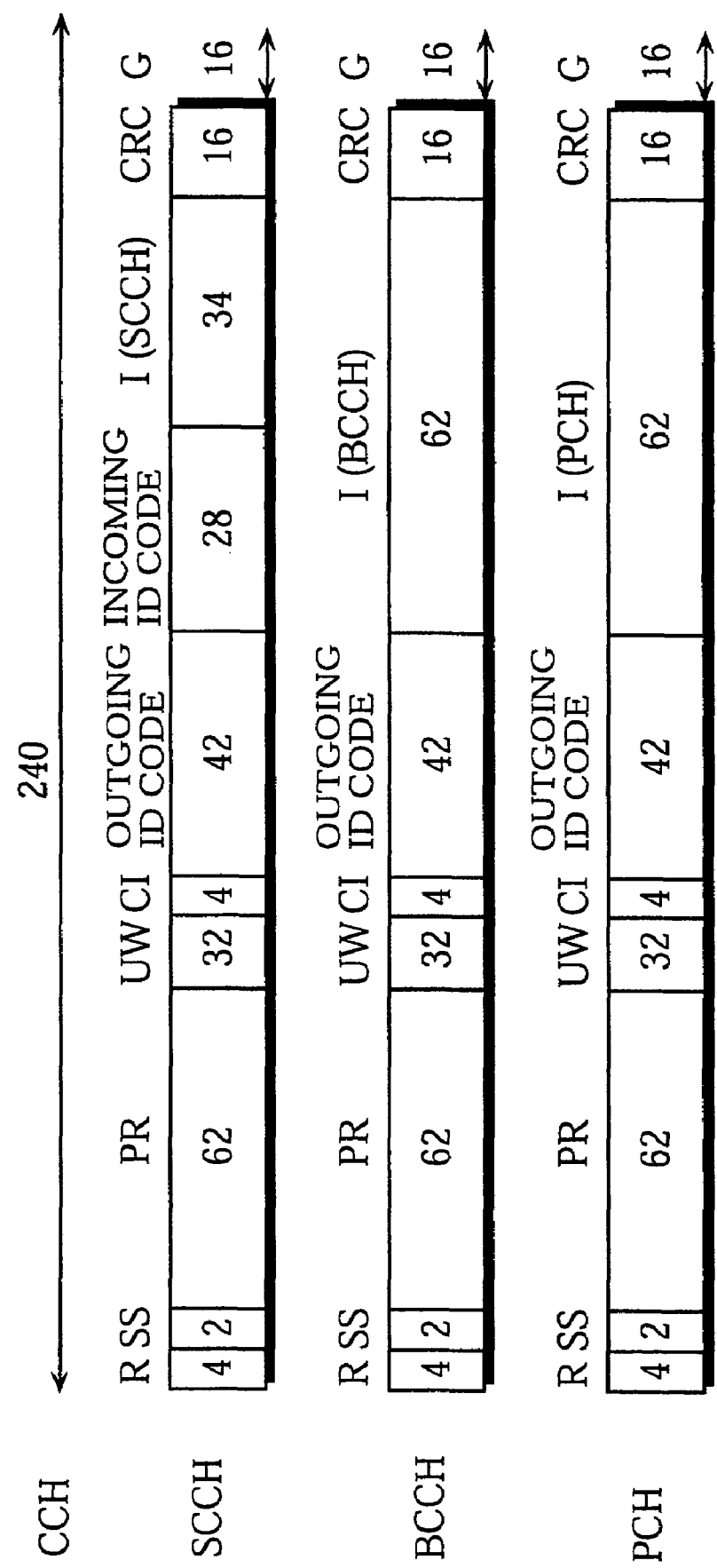

WIRELESS BASE STATION FOR REDUCING INTERFERENCE FROM A CONTROL SIGNAL EMITTED BY ANOTHER WIRELESS BASE STATION

CROSS REFERENCE TO RELATED APPLICATION

This is a divisional application which claims the benefit of pending U.S. patent application Ser. No. 09/715,087, filed Nov. 20, 2000 now U.S. Pat. No. 7,110,793. The disclosure of the prior application is hereby incorporated herein in its entirety by reference.

BACKGROUND OF THE INVENTION

1. Field of the Invention

The present invention relates to a wireless base station for forming an adaptive array antenna pattern using a plurality of antennas.

2. Description of the Related Art

Digital communications devices used in recent years transmit information using a digital information signal (baseband signal) to modulate a carrier wave, thereby making transmission more efficient.

When digital communication is performed, a plurality of users can occupy a single frequency simultaneously, by improving transmission speed and using time-division multiplexing. This enables frequency resources to be used more effectively. Space division multiplexing techniques, in which a plurality of users can each occupy a plurality of channels on a single frequency simultaneously through use of an adaptive array method, have been attracting particular attention of late.

An adaptive array method forms an adaptive directional pattern (known as an array antenna pattern) using a plurality of antennas, so that wireless waves can be directed only toward a user located in a specific direction. In an adaptive array apparatus that includes four wireless units, each including a transmission circuit, a reception circuit, and an antenna, the amplitude and the phase of (a) transmission signals transmitted by each of the transmission circuits, and (b) reception signals received by each of the reception circuits are adjusted respectively at transmission and reception. This enables appropriate directional patterns to be formed at transmission and reception. Such an adaptive array method is explained in more detail in *Kukan Ryoiki Ni Okeru Tekioshingo Shori To Sono Ouyougijyutsu Ronbuntokushu* (Adaptive Signal Processing and Applied Techniques in the Spatial Domain: Special Edition) in *Denshi Tsushin Gakkai Ronbunshi* (The Transactions of the Institute of Electronics, Information, and Communication Engineers (IEICE)) Vol. J75-B-II No. 11, November), so detailed explanation is omitted here.

A wireless base station using an adaptive array method can communicate simultaneously with a plurality of mobile stations. This is achieved by forming a different directional pattern for each of the plurality of mobile stations to multiplex the mobile stations simultaneously on a single frequency. This type of communication may be referred to as path division multiple access (PDMA), and is a space diversity technique. PDMA is described in *Pasu Bunkatsu Tagen Setsuzoku* (PDMA) *Ido Tsushin Hoshiki* (The Path Division Multiple Access (PDMA) Mobile Radio Communication Systems) (IEICE Technical Report RCS93-84 (1994-01), pages 37 to 44), so a detailed explanation is omitted here.

When an adaptive array wireless base station is used in a mobile communication system such as the personal handyphone system (PHS), use of directional patterns needs to be determined according to whether a mobile station is using a control channel used for controlling incoming and outgoing calls, or a traffic channel (also known as a communication channel) used for making calls. In other words, the wireless base station transmits and receives control signals on control channels using an omni-directional pattern that does not use path multiplexing, and transmits and receives communication signals (audio signals) on traffic channels by path multiplexing using a directional pattern.

However, if a mobile communication system includes a plurality of wireless base stations using the related art technology described above, the problem of interference between control signals emitted by the plurality of base stations is inescapable.

To take one example, each wireless base station in the PHS transmits control signals intermittently in cycles of approximately 100 ms on a common frequency allocated for control channel use, by time-division multiplexing the common frequency with other wireless base stations. However, if interference from a control signal emitted by another wireless base station is experienced when a link channel establishing request is received from a mobile station, or when a link channel allocation (frequency number and timeslot number of a traffic channel) is transmitted, the wireless base station has to make a further attempt (retry) to switch from the control channel to the traffic channel, and further failures to complete the transfer may also ensue.

SUMMARY OF THE INVENTION

The present invention has been developed to overcome the above mentioned problem, and has as its object the provision of a wireless base station for reducing interference from a control signal emitted by another wireless base station.

A wireless base station that achieves the above object makes a wireless connection with a mobile station by forming an array antenna pattern using a plurality of antennas. This wireless base station includes a transmitting unit that forms an omni-directional pattern to transmit a control signal intermittently via a control channel, and a receiving unit that forms an array antenna pattern to receive a control signal transmitted from a mobile station via the control channel.

This structure has the effect of reducing the amount of interference from a control signal emitted by another base station when a control signal is received from a mobile station. As a result, wireless connections can be made with greater reliability when a call is made or received.

Furthermore, the receiving unit includes a calculating unit and a combining unit. The calculating unit calculates a weight coefficient for each of the plurality of antennas based on an input signal received by each antenna. Here, the input signals correspond to a fixed bit pattern in the control signal. The combining unit combines input signals received by each antenna using the calculated weight coefficients to obtain a reception signal.

In addition to the above described effect, this structure calculates weight coefficients used when receiving a control signal from a mobile station, by extracting a fixed bit pattern from a signal received by each of a plurality of antennas. This means that weight coefficients can be accurately calculated.

Furthermore, the control signal received by the receiving unit is a message from the mobile station requesting the wireless base station to allocate a traffic channel, and the transmitting unit further forms an array antenna pattern and raises transmission power to transmit a message allocating a traffic channel to the mobile station via the control channel.

This structure transmits traffic channel allocation messages by forming an array antenna pattern, and raising transmission power. This allows accommodation of a degree of variation in the reception environment caused by movement of the mobile station. Furthermore, the control signal transmitted by the mobile station is a message requesting the wireless base station to allocate a traffic channel, and the transmitting unit further forms an omni-directional pattern to transmit a message allocating a traffic channel to the mobile station via the control channel.

This structure transmits traffic channel allocation messages using omni-transmission, thereby enabling the allocation message to be transmitted accurately to the mobile station even if the amount of time between reception of an allocation request and transmission of the allocation message is fairly lengthy. Furthermore, by using omni-transmission for an allocation message, this structure enables the allocation message to be transmitted accurately to the mobile station even if an accurate array antenna pattern could not be formed and communication quality was poor when a traffic channel allocation request was received (i.e. the sum of errors between the input signals and a reference signal was large).

Furthermore, the control message transmitted by the mobile station is a message requesting the wireless base station to allocate a traffic channel, and the transmitting unit further determines whether a message allocating a traffic channel should be transmitted to the mobile station via the control channel using an omni-directional pattern or an array antenna pattern, and forms the determined pattern to transmit the message allocating a traffic channel.

This structure enables the wireless base station to determine whether to transmit a traffic channel allocation message at a raised transmission output using an array antenna pattern or by using omi-transmission.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is a block diagram showing a structure of a user processing unit 51a;

FIG. 5 shows control signal types and corresponding data formats;

DESCRIPTION OF THE PREFERRED EMBODIMENTS

First Embodiment

A wireless base station in the first embodiment makes a wireless connection with one or more mobile stations by forming an array antenna pattern using a plurality of antennas. The wireless base station is installed as a PHS base station that forms a channel connection with a PHS telephone by performing time division multiple access/time division duplexing (TDMA/TDD) according to the PHS standard. The wireless base station performs path multiplexing in addition to TDMA. Here, the wireless base station transmits a control signal intermittently via a control channel by forming a omni-directional pattern. Then, the wireless base station receives a control signal transmitted from a mobile station via the control channel by forming a directional pattern in response to the received signal. The wireless base station further performs transmission and reception of communication signals (audio signals) on a traffic channel (also known as a communication channel) by performing path multiplexing using a directional pattern.

Hereafter, transmission and reception performed by forming a directional pattern (also known as an array antenna pattern) is referred to as array transmission and array reception. Meanwhile, transmission and reception performed by forming a nondirectional pattern (also known as an omni-directional pattern) is referred to as omni-directional-transmission and omni-directional-reception (hereafter respectively shortened to 'omni-transmission' and 'omni-reception').

Overall Structure

Figure 1:
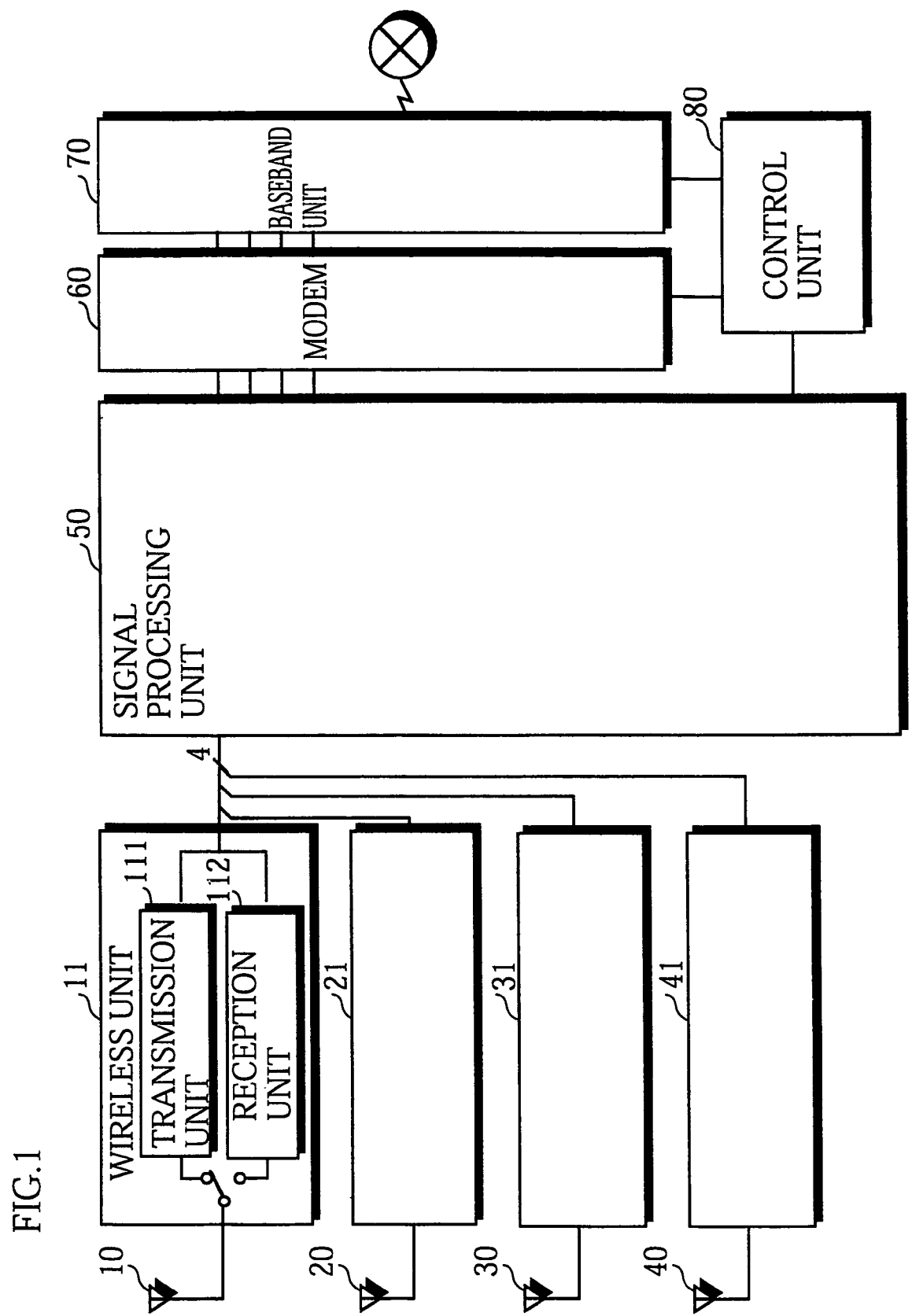
FIG. 1 is a block diagram showing a structure of a wireless base station in a first embodiment.
Figure 2:
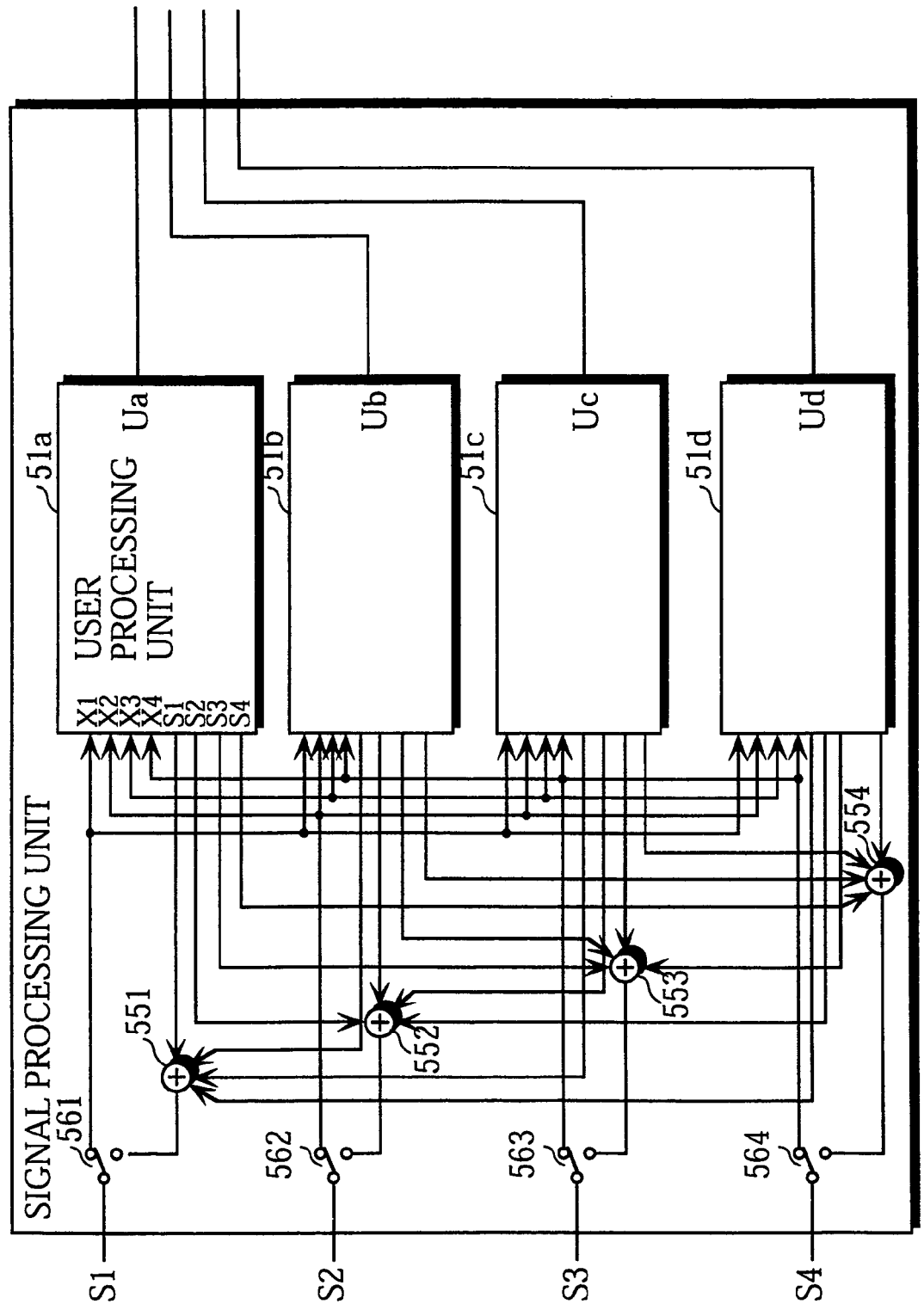
FIG. 2 is a block diagram showing a structure of a signal processing unit 50.

FIG. 1 is a block diagram showing a structure of the wireless base station in the first embodiment. The wireless base station shown in this drawing includes a baseband unit 70, a modem 60, a signal processing unit 50, wireless units 11, 21, 31, and 41, antennas 10, 20, 30, and 40, and a control unit 80.

The baseband unit 70 is located between a plurality of telephone lines connected via a telephone exchange net, and the modem 60, and performs TDMA/TDD processing for each signal that is to be path-multiplexed. TDMA/TDD processing involves multiplexing and separating a plurality of signals (baseband signals showing speech and data) so that they correspond to a TDMA/TDD frame. Here, a TDMA/TDD frame has a period of 5 ms, and is divided into eight equal parts, forming four transmission timeslots and four reception timeslots. To be more specific, the baseband unit 70 time-division multiplexes signals from the plurality of telephone lines so that four channels are multiplexed into each TDMA/TDD frame. Then, a maximum of four signals per transmission timeslot is output to the modem 60 for path multiplexing. Conversely, the baseband unit 70 receives a maximum of four signals per reception timeslot from the modem 60, and separates the time-division multiplexed signals in each TDMA/TDD frame before outputting the separated signals to the plurality of telephone lines.

The modem 60 modulates signals input from the baseband unit 70, and demodulates signals input from the signal processing unit 50. The method used for modulation and demodulation is n/4 shift QPSK (quadrature phase shift keying).

The signal processing unit 50 calculates parameters for array transmission and reception so that the four antennas 10, 20, 30, and 40 can be treated as a single array antenna. When a signal is to be path-multiplexed, the parameters are weight coefficients for adjusting amplitudes and phases applied to transmission/reception signals from each of wireless units 11, 21, 31, and 41. In other words, a directional pattern for a signal is formed by assigning weights to reception or transmission signals from each of wireless units 11, 21, 31, and 41 when a signal is transmitted or received simultaneously by a plurality of antennas. Specifically, when a signal is received, the signal processing unit 50 calculates parameters based on reception signals from each of the wireless processing units 11, 21, 31, and 41, assigns weights to the reception signals and then combines the reception signals, according to the calculated parameters. This enables a directional pattern to be formed for reception. Furthermore, when a signal is transmitted, the signal processing unit 50 uses the parameters calculated at reception to assign weights to transmission signals for each of wireless units 11, 21, 31, and 41. This enables a directional pattern to be formed for transmission.

The wireless units 11, 21, 31, and 41, when performing array transmission, convert the signals to which weights have been assigned by the signal processing unit 50 to radio frequency (RF) signals, and transmit the converted RF signals from the antennas 10, 20, 30, and 40. Furthermore, the wireless units 11, 21, 31, and 41, when performing array reception, convert signals from the antennas 10, 20, 30 and 40 to baseband signals, and output the baseband signals to the signal processing unit 50. Note that when omni-transmission or omni-reception is performed, only the wireless unit 11 is operated, and the operations of the wireless units 21, 31, and 41 are suspended.

The control unit 80 indicates to the signal processing unit 50 which of array transmission or omni-transmission, and array reception or omni-reception, is to be performed in each timeslot. In other words, as a basic principle, the control unit 80 indicates that array reception should be performed when a control signal is received, and that omni-transmission should be performed when a control signal is transmitted. The control unit 80 indicates that omni-transmission should be performed according to this basic principle when transmitting a control signal to an unspecified mobile station, and indicates that one of omni-transmission or array transmission at an increased transmission power is to be performed for a specified mobile station, depending on current conditions.

FIG. 5 shows control signal types and corresponding data formats. In the drawing, the horizontal axis is a time axis, and a data format for a bit sequence transmitted or received in one timeslot is shown. A signaling control channel (SCCH) is for transmitting messages to a specified mobile station. A broadcasting control channel (BCCH) is for transmitting messages such as channel structure information from the wireless station to unspecified mobile stations. A paging channel (PCH) is for transmitting messages such as general calls to unspecified mobile stations. The format shown in FIG. 5 complies with the PHS standard, so is not explained in detail here.

Figure 4A:
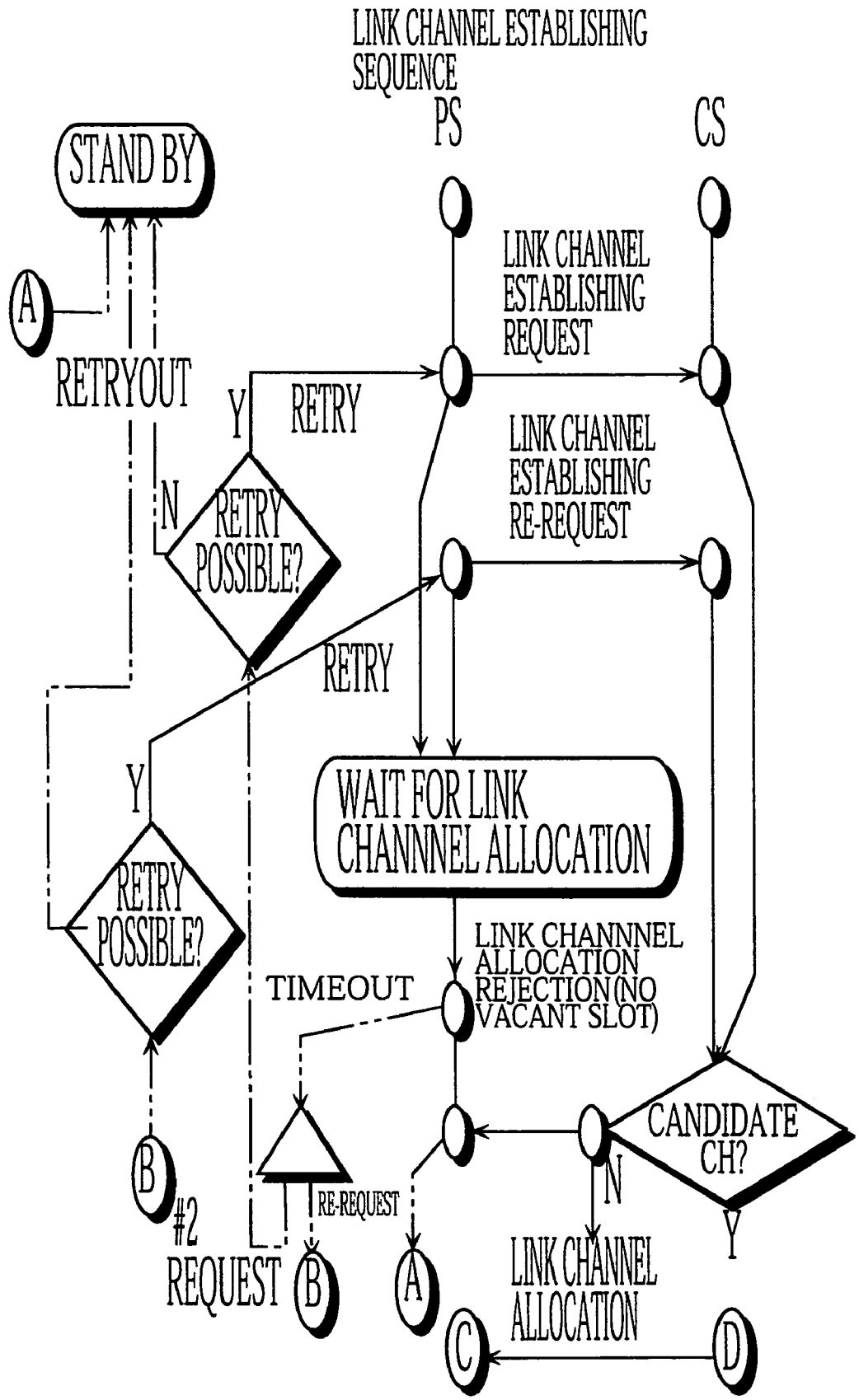
FIGS. 4A and 4B show a link channel establishing sequence.
Figure 4B:
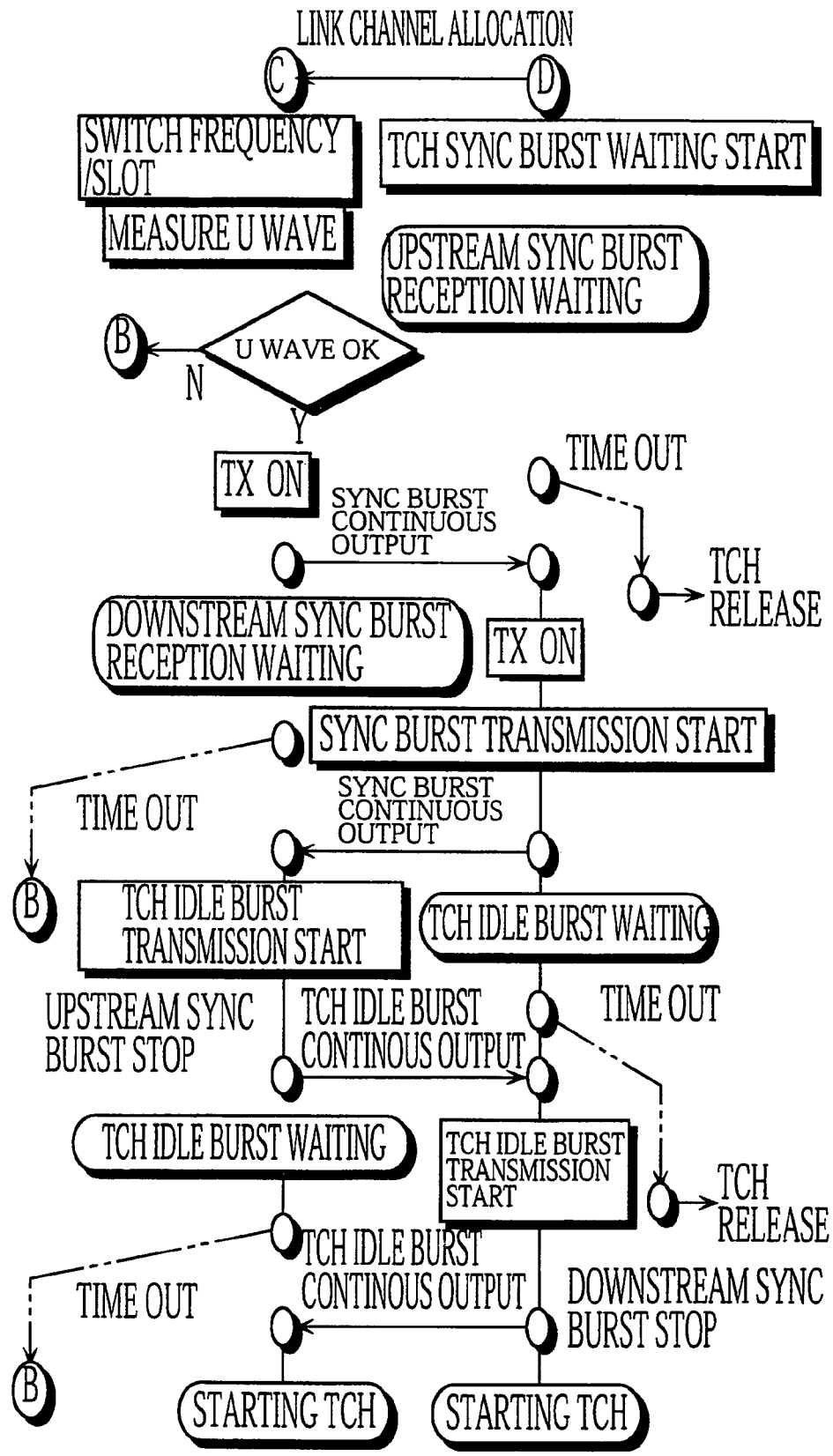

Examples of messages transmitted on the SCCH are a link channel establishing request (hereafter Lch establishing request), a link channel establishing re-request (hereafter Lch channel establishing re-request) a link channel allocating request (hereafter Lch allocating request), and a link channel allocation rejection (hereafter Lch allocation rejection). FIG. 4 shows a link channel establishing sequence using these messages that is directed to a specified mobile station. The sequence in the drawing complies with the PHS standard, and so explanation is confined to a description of a control signal on a control channel.

An Lch establishing request is transmitted from a mobile station to the wireless base station, and is a message used for allocation of and linking to a traffic channel when a mobile station transfers to a traffic channel on performing such procedures as registering a current location, calling, receiving a call, handing over, and switching channels. A Lch establishing re-request is transmitted from a mobile station to the wireless base station as a result of a timeout or similar phenomenon occurring after the mobile station has transmitted the Lch establishing request, and is identical to the Lch establishing request.

An Lch allocation is transmitted from the wireless base station to a mobile station, and includes a frequency number and a slot number specifying a traffic channel to be allocated. An Lch allocation rejection is transmitted from the wireless station to a mobile station, and indicates that a traffic channel cannot be allocated.

The control unit 80 instructs the signal processing unit 50 to perform array reception according to the basic principle described above in the case of an Lch establishing request or an Lch establishing re-request, and to either perform omni-transmission or raise transmission power and then perform array transmission in the case of an Lch allocation or an Lch allocation rejection. Since Lch allocations and Lch allocation rejections are directed to a specified mobile station, it is thought preferable to use array transmission rather than omni-transmission for such messages. The signal processing unit 50 uses parameters. calculated when an Lch establishing request or an Lch establishing re-request was received when performing array transmission of the Lch allocation or the Lch allocation rejection. However, the location and propagation environment of the specified mobile station when the wireless station transmits the Lch establishing request or the Lch establishing re-request may differ enormously from those when the wireless station transmits the Lch allocation or the Lch allocation rejection. As a result, there is no guarantee that a valid array antenna pattern can be formed, even if the parameters calculated upon receiving the Lch establishing request or the Lch establishing re-request are used. The reason for this is that a time lag is generated while the wireless base station performs processing to search for a vacant traffic channel and then select this channel. Moreover, if the weight coefficients calculated when a Lch establishing request is received are inaccurate (in other words if there is a large margin of error compared with the reference signal described later in this specification) an accurate array antenna pattern cannot be formed.

Here, the control unit 80 in the present embodiment determines whether to use omni-transmission or array transmission depending on the time lag between the reception time and the transmission time described above, and if array transmission is to be used, transmits the signal at a raised transmission power. Raising transmission power widens the area covered by the array antenna pattern, so this helps to accommodate variations in the position and propagation environment of the specified mobile station.

Structure of Signal Processing Unit 50

FIG: 2 is a block diagram showing a structure of the signal processing unit 50. The signal processing unit 50 includes user processing units 51a to 51d, adders 551 to 554, and switches 561 to 564 for switching between transmission and reception. When an array transmission or array reception instruction is received from the control unit 80, the signal processing unit 50 calculates weight coefficients and assigns weights. When an omni-transmission or omni-reception instruction is received, the signal processing unit 50 operates only user data processing unit 51a, and not user data processing units 51b to 51d.

The user data processing units 51a to 51d correspond to a maximum of four user signals that can be path-multiplexed in any one timeslot. In a reception timeslot, each of the user data processing units 51a to 51d calculates weight coefficients, uses the weight coefficients to extract a user signal by combining reception signals input from the wireless units 11, 21, 31, and 41, via the switches 561 to 564, and then, in a transmission timeslot, uses weight coefficients calculated in the previous reception timeslot to output one of the user signals to each of the wireless units 11, 21, 31, and 41.

The user processing unit 51a, when performing omni-transmission, outputs an unaltered control signal from the modem 60 to the wireless unit 11 via the adder 551 and the switch 561 without assigning a weight.

The adder 551 combines weight-assigned components of user signals for the wireless unit 11. The adders 552 to 553 perform the same function as the adder 551, but for the wireless units 21, 31, and 41 respectively.

Structure of User Processing Unit

The user processing units 51a to 51d have the same structure, so the user processing unit 51a is described here as a representative example.

Figure 3:
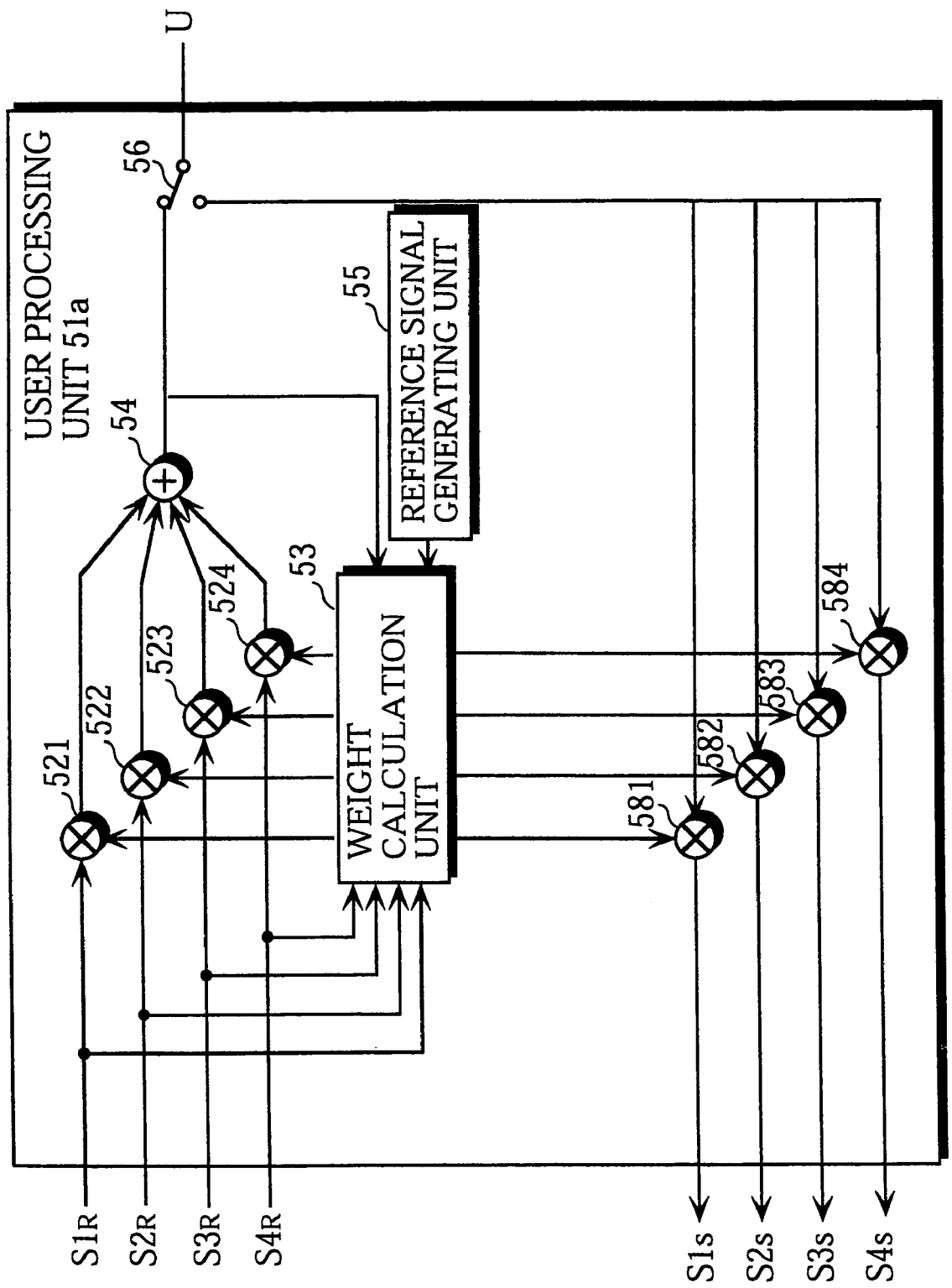

FIG. 3 is a block diagram of a structure of the user processing unit 51a. The user processing unit 51a includes a weight calculation unit 53, an adder 54, a reference signal generating unit 55, a switch 56, multipliers 521 to 524, and multipliers 581 to 584.

Figure 6:
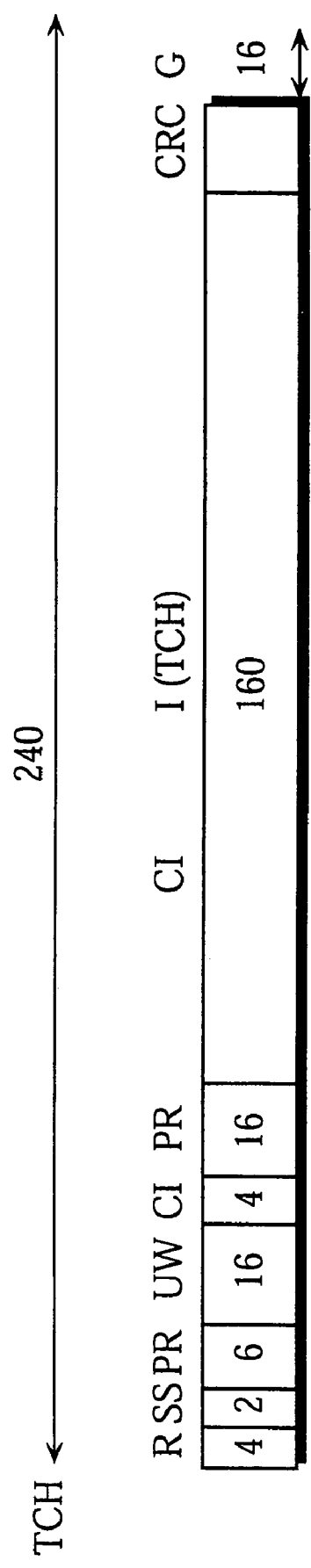
FIG. 6 shows a data format of a traffic channel.

The weight calculation unit 53 calculates weight coefficients for each symbol period or specified symbol period in a fixed bit pattern interval in a reception timeslot, so that the sum of errors between each of reception signals S1R to S4R from the wireless units 11, 21, 31, and 41, and a reference signal generated by the reference signal generating unit 55 is kept to a minimum. Here, the reference signal is symbol data within a fixed bit pattern (fixed symbol) interval included in control signals on the control channel and communication signals on the traffic channel. FIGS. 5 and 6 show data formats for a control signal on the control channel and a communication signal on the traffic channel. These drawings comply with the PHS standard, so a detailed explanation is omitted here. The fields R (ramp bits), SS (start symbol), PR (preamble), and UW (Unique Word) in both the control signal and the communication signal form a predetermined fixed bit pattern, and can therefore used as the reference signal. Moreover, an outgoing ID code, and an incoming ID code in the control signal are predetermined and so may be used as a reference signal.

Furthermore, the weight calculation unit 53 outputs calculated weight coefficients to the multipliers 521 to 524 during the reception timeslot for each of the symbol periods in which the weight coefficients are calculated and subsequent symbol periods.

In addition, during a transmission timeslot, the weight calculation unit 53 outputs weight coefficients calculated in a previous corresponding reception timeslot to the multipliers 581 to 584.

The reference signal generating unit 55 outputs symbol data forming a reference signal in sync with the symbol timing of the fixed bit pattern interval shown in FIG. 5, when the reception timeslot is for a control channel. The reference signal generating unit 55 outputs symbol data forming a reference signal in sync with the symbol timing of the fixed bit pattern interval shown in FIG. 6 to the weight calculation unit 53, when the reception timeslot is for a traffic channel.

The multipliers 521 to 524 and the adder 54 assign weights to reception signals X1 to X4 from wireless units 11, 21, 31, and 41 and combine the weighted signals, during a reception timeslot. Weights are assigned using weight coefficients output from the weight calculation unit 53. As a result of this combination, a reception symbol for a user a is extracted from the path-multiplexed reception signals for a maximum number of four users a to d.

Te multipliers 581 to 584 assign weights to a transmission symbol for user a for each of the wireless units 11, 21, 31, and 41 during a transmission timeslot. Weights are assigned using the weight coefficients output from the weight calculation unit 53.

Figure 8:
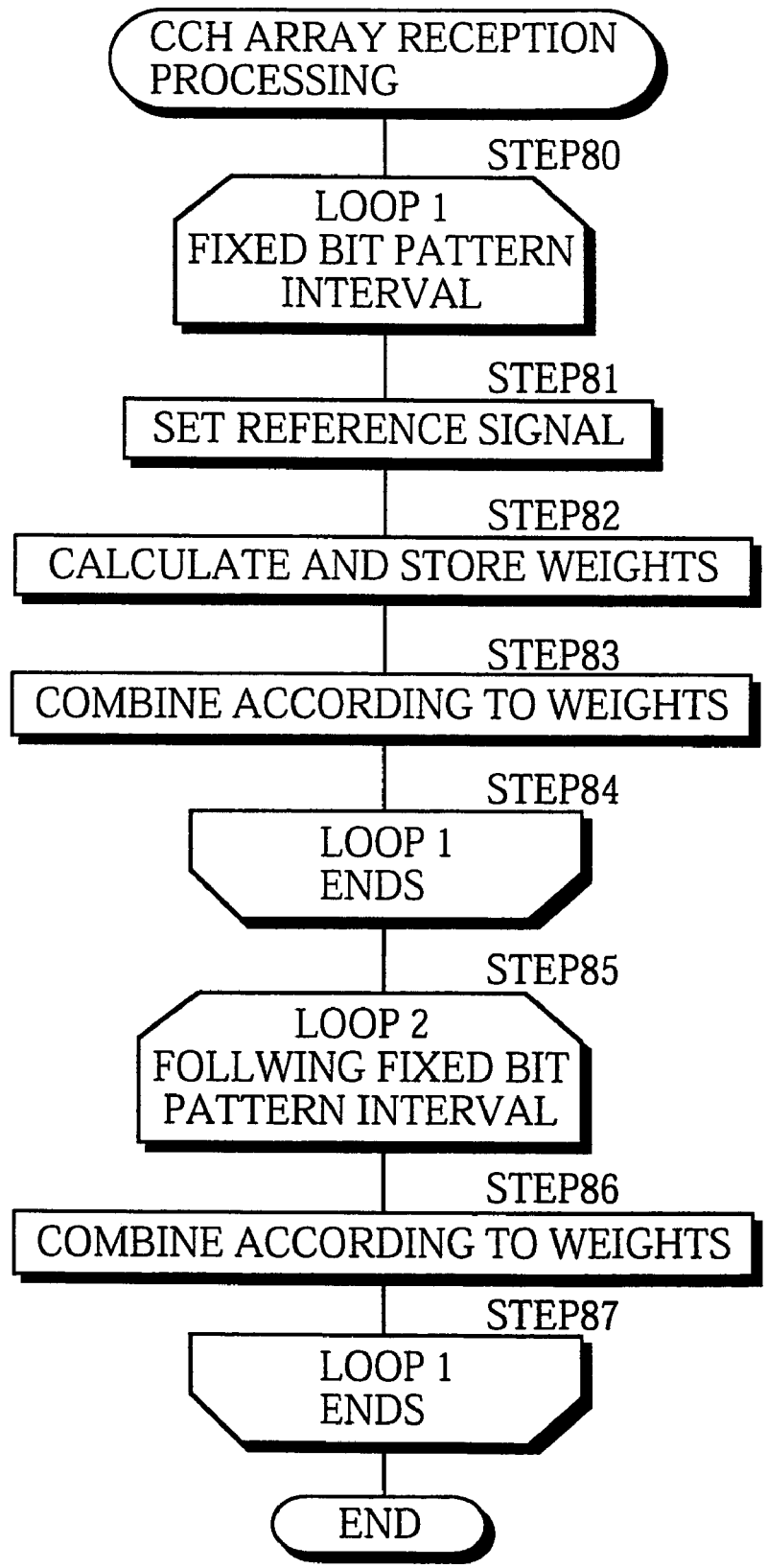
FIG. 8 is a flowchart showing processing performed when the user processing unit 51a receives a control channel using array reception.

FIG. 8 is a flowchart showing processing performed by the user processing unit 51a when performing array reception via a control channel. In the drawing, the processing of loop 1 (steps 80 to 84) indicates that the processing of steps 81 to 83 is performed by the user processing unit 51a in each symbol period. However, in order to reduce the load placed on the signal processing unit 50 (a DSP, or digital signal processor), step 82 may be performed in only one of a plurality of symbol periods. Furthermore, the processing of loop 2 (steps 85 to 87) is performed by the user processing unit 51a in each symbol period.

FIG. 8 shows array reception processing performed on a control channel, but the same processing is used for array reception processing performed on a traffic channel.

SCCH Reception Processing

Figure 7:
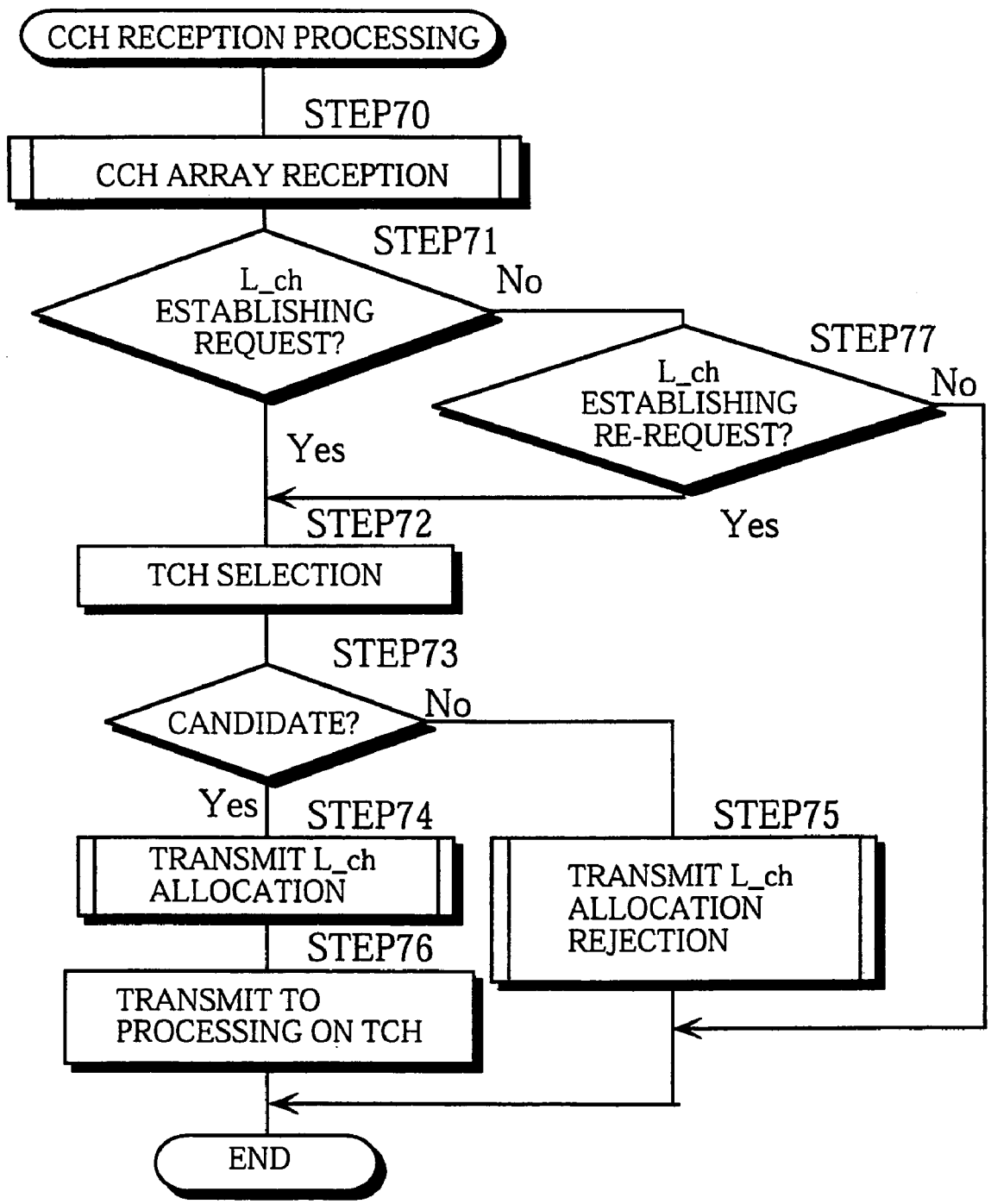
FIG. 7 is a flowchart showing processing performed when a wireless base station receives a control signal from a mobile station.

FIG. 7 is a flowchart showing processing performed when the wireless base station receives a control signal from a mobile station. The drawing shows processing in the link channel establishing sequence shown in FIG. 4 that is performed by the wireless base station.

The control unit 80 instructs the signal processing unit 50 to perform array reception in a reception timeslot of the control channel. Consequently, the signal processing unit 50 performs always performs array reception, by assigning weights to the control signal received from the mobile station, and performing combining (step 70).

If the control signal received using array reception is an Lch establishing request (step 71), the control unit 80 selects a candidate-transmission channel from unused time-divided channels in the TDMA/TDD frame, and unused path-multiplexed channels (step 72).

If a candidate transmission channel cannot be selected (step 73, No), the control unit 80 indicates one of omni-transmission and array transmission and has the signal processing unit 50 transmit a Lch allocation rejection (step 75).

If a candidate transmission channel can be selected (step 73, Yes), the control unit 80 indicates one of omni-transmission and array transmission, has the signal processing unit 50 transmit a Lch allocation request (step 74), and then moves to the remaining processing in the link establishing sequence (step 76).

The control unit 80 performs steps 72 to 76 in the same way if the control signal received at step 70 is an Lch establishing re-request.

Control Signal Transmission Processing

Figure 9:
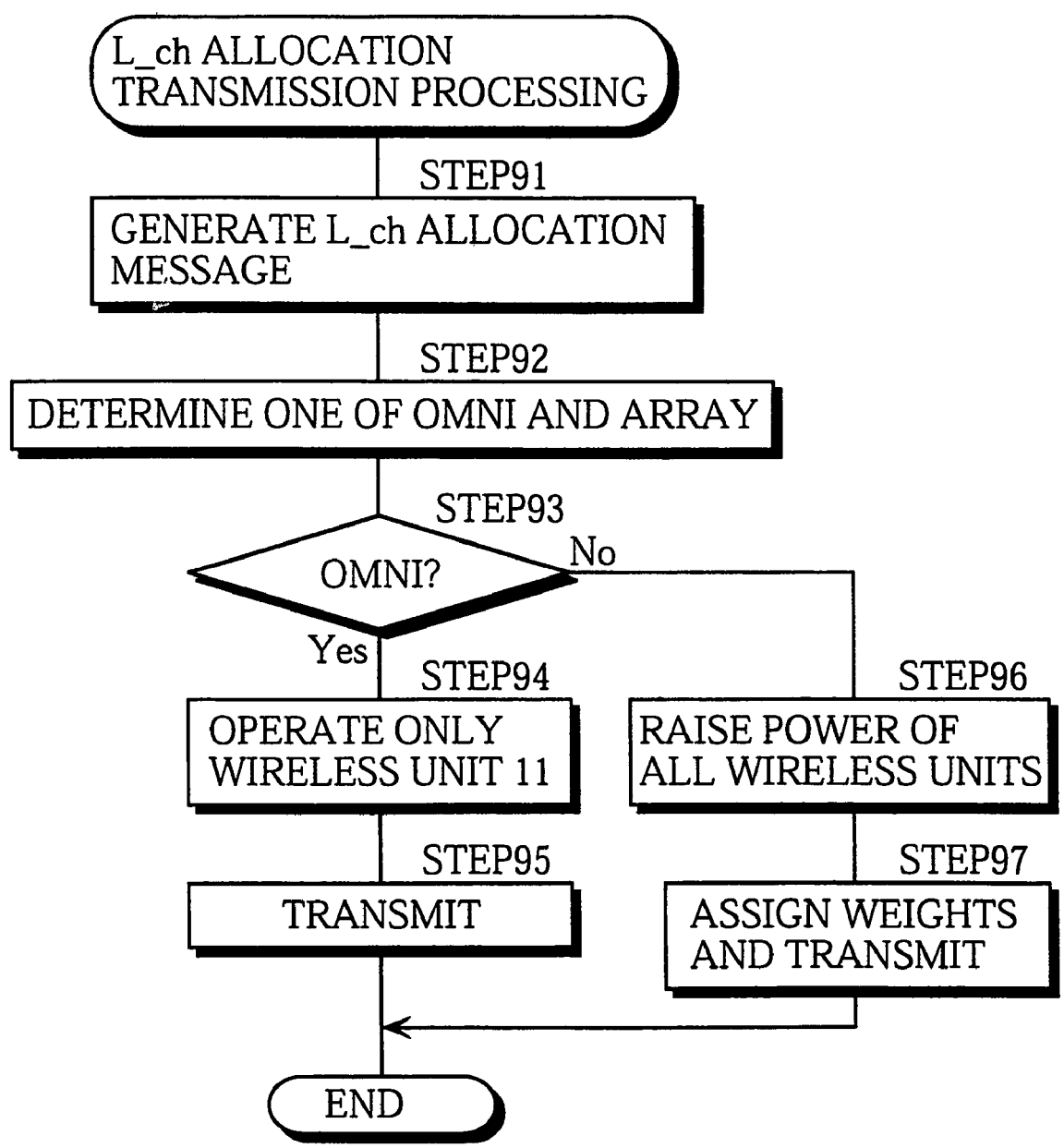
FIG. 9 is a flowchart showing transmission processing of a link channel allocation message.

FIG. 9 is a flowchart showing transmission processing for an Lch allocation shown in step 74 of FIG. 7.

In FIG. 9, the control unit 80 generates an Lch allocation message indicating a frequency number and slot number for the traffic channel selected at step 72 (step 91), and determines whether to use omni-transmission or array transmission (step 92). For example, the control unit 80 measures the time from when the Lch establishing request was received until the present, and determines to use array transmission if the measured time is shorter than a threshold value (for example 3 frames or more, that is about 17 ms or more), and to use omni-transmission if the measured time is longer than the threshold value. This is because there is thought to be little variation in the position and propagation environment of the mobile station if the measured time is shorter than the threshold value, so the weight coefficients calculated when the Lch establishing request was received are still valid. Such variations are likely to be more marked, however, when the measured time exceeds the threshold value by a larger amount.

Furthermore, the control unit 80 may save the sum of errors between a Lch establishing request and the reference signal generated when the former is received, and determine that omni-transmission is to be performed if the error is at least as large as a threshold value, and that array transmission is to be performed if the error is smaller than the threshold value. If such processing is performed, the Lch allocation can be transmitted accurately to the mobile station by using omni-transmission, even if communication quality is poor (i.e. the error between the received signal and the reference signal is large) when the Lch establishing request was received, making it impossible to form an accurate array pattern.

Alternatively, the control unit 80 may determine whether to use omni-transmission or array transmission by using the time between the reception of the Lch establishing request and the present, in combination with the margin of error with the reference signal.

When use of omni-transmission is determined, the control unit 80 temporarily suspends the operation of the wireless units 21, 31, and 41, and operates only the wireless unit 11 (step 94), to have a Lch allocation transmitted (step 95). When use of array transmission is determined, the control unit 80 controls the wireless units 11, 21, 31, and 41 to temporarily raise transmission power (step 96) and has an Lch allocation transmitted by array transmission (step 97).

In FIG. 9, processing for transmitting an Lch allocation rejection shown in step 76 is identical to the processing described above, apart from the fact that the content of the message-generated at step 91 is different.

Other Modifications

Note that, at step 92, the control unit 80 determines whether to use omni-transmission or array transmission according to how much time had passed since the Lch establishing request was received. However, omni-transmission and array transmission may be given a fixed setting according to the type of environment in which the wireless base station is located. For instance, wireless base stations located in or near to residential areas, parks, overnight accommodation and the like, where mobile stations are thought unlikely to move a great deal, may be given a fixed array transmission setting, while wireless base stations located along highways and railways where mobile stations are thought likely to move considerably, are given a fixed omni-transmission setting. Alternately, wireless base stations may be given fixed settings at different times of day.

Furthermore, when omni-transmission is performed at step 95, transmission power may be temporarily reduced when transmitting, if the reception field strength of the mobile station is high. This enables interference from other wireless base stations to be reduced.

In FIG. 1, four antennas and wireless units are shown, but a different number may be used.

The wireless base station in the above embodiment is employed in the PHS, but the present invention may be used in any other telephone system that distinguishes between control channels and traffic channels, provided that the control channel communicates both control signals to specified mobile stations and control signals to unspecified mobile stations.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A wireless base station for reducing interference between the base station and a specified mobile station caused by control signals emitted by other wireless base stations, the base station comprising:

a receiving unit for receiving a control signal requesting channel allocation information through each of a plurality of antennas;

a calculating unit for calculating a weight coefficient for the control signal requesting channel allocation information received by each of the plurality of antennas;

a combining unit for combining the control signal requesting channel allocation information received by each of the plurality of antennas and the calculated weight coefficient in order to form an array antenna pattern;

a transmitting unit for transmitting a control signal containing channel allocation information to the mobile station; and a control unit for instructing the transmitting unit to temporarily raise transmission power and use the array antenna pattern to transmit the control signal containing channel allocation information to the mobile station, and when (1) communication quality is poor and (2) a time lapse between the receiving unit receiving the control signal requesting channel allocation information from the mobile station and the transmitting unit transmitting the control signal containing channel allocation information to the mobile station exceeds a predetermined length, the control unit forces the transmitting unit to use an omni-directional pattern to transmit the control signal containing channel allocation information to the mobile station, and when (1) communication quality is high and (2) the time lapse exceeds a predetermined length, the control unit forces the transmitting unit to temporarily lower transmission power and use an omni-directional pattern to transmit the control signal containing channel allocation information to the mobile station.

2. The wireless base station of claim 1, wherein the control signal containing channel allocation information transmitted to the mobile station includes information representing a link channel establishing request, a link channel establishing re-request, a link channel allocation request, or a link channel allocation rejection.

3. A controlling method to be used by a wireless base station for reducing interference between the base station and a specified mobile station caused by control signals emitted by other wireless base stations, the method comprising the steps of:

receiving by means of a receiving unit a control signal requesting channel allocation information through each of a plurality of antennas;

calculating by means of a calculating unit a weight coefficient for the control signal requesting channel allocation information received by each of the plurality of antennas;

combining by means of a combining unit the control signal requesting channel allocation information received by each of the plurality of antennas and the calculated weight coefficient in order to form an array antenna pattern;

transmitting by means of a transmitting unit a control signal containing channel allocation information to the mobile station; and instructing by means of a control unit the transmitting unit to temporarily raise transmission power and use the array antenna pattern to transmit the control signal containing channel allocation information to the mobile station, and when (1) communication quality is poor and (2) a time lapse between the receiving unit receiving the control signal requesting channel allocation information from the mobile station and the transmitting unit transmitting the control signal containing channel allocation information to the mobile station exceeds a predetermined length, forcing by means of the control unit the transmitting unit to use an omni-directional pattern to transmit the control signal containing channel allocation information to the mobile station, and when (1) communication quality is high and (2) the time lapse exceeds a predetermined length, forcing by means of the control unit the transmitting unit to temporarily lower transmission power and use an omni-directional pattern to transmit the control signal containing channel allocation information to the mobile station.

* * * * *